United States Patent [19]

Ghaouth et al.

[11] Patent Number: 5,633,025

[45] Date of Patent: May 27, 1997

[54] BIOACTIVE COATING FOR HARVESTED COMMODITIES

[75] Inventors: Ahmed El Ghaouth; Charles L. Wilson, both of Frederick, Md.

[73] Assignee: The United States of America as represented by the Secretary of Agriculture, Washington, D.C.

[21] Appl. No.: 336,079

[22] Filed: Nov. 7, 1994

[51] Int. Cl.$^6$ .......................................... A23L 3/00
[52] U.S. Cl. ........................... 426/62; 426/302; 426/310; 426/335; 426/532; 424/405; 435/255.1; 514/54
[58] Field of Search ............... 426/62, 302, 310, 426/532, 61, 89, 308, 309, 321, 335, 658; 424/405, 406, 407; 435/255.1, 255.4, 255.5; 514/54, 55, 57

[56] References Cited

U.S. PATENT DOCUMENTS

| | | | |
|---|---|---|---|
| 2,987,403 | 6/1961 | Tupper | 426/62 |
| 4,871,556 | 10/1989 | St. Angelo et al. | 426/92 |
| 4,996,150 | 2/1991 | Joung et al. | 435/161 |
| 5,061,697 | 10/1991 | Shasha et al. | 514/60 |
| 5,273,749 | 12/1993 | Bok et al. | 424/405 |

OTHER PUBLICATIONS

Fujiwara et al., Patent Abstracts of Japan, 02–135080, May 1990, (abstract only).
El Ghaouth et al., in *Advances in Chitin and Chitosan*, Brines et al., Eds. Elsevier Applied Sci., London, pp. 440–452 (1992).
Averbach, B., in Proc. *1st Int. Conf. Chitin and Chitosan*, Muzzareli and Pariser, eds. MIT, Cambridge, MA, pp. 199–209 (1978).
Wilson and El Ghaouth, in Symposium Proceeding, Beltsville Symposium IVIII (1993).
El Ghaouth et al., *Mycol. Res.*, vol. 96(9), pp. 769–779 (1992).

*Primary Examiner*—Leslie Wong
*Attorney, Agent, or Firm*—M. Howard Silverstein; John Fado; Janelle S. Graeter

[57] ABSTRACT

A coating for harvested agricultural commodities which delays ripening and controls decay is described. The coating comprises a modified chitosan matrix containing a yeast antagonistic to postharvest pathogens. The modified chitosan may be carboxymethylchitosan or glycolchitosan. The combined fungicidal activities of the modified chitosan and the antagonistic yeast make this formulation an attractive preservative which is superior to existing coatings and ensures the even distribution of the antagonistic yeast over the surface of the harvested commodity, thus increasing its effectiveness.

10 Claims, 3 Drawing Sheets

BIOACTIVE COATING FOR HARVESTED COMMODITIES

BACKGROUND OF THE INVENTION

1. Field of the Invention

The present invention is related to a composition which serves as a bioactive coating for harvested agricultural commodities to delay ripening and control decay.

2. Description of the Prior Art

Present coatings (mostly waxes) for postharvest commodities are effective in delaying ripening, but in general, do not prevent decay. Moreover, they are under scrutiny as possible health hazards. Synthetic fungicides which have been added to the coatings to alleviate the problems of decay have recently been withdrawn from the market, and there is also public pressure to remove the petroleum-based coatings because of health and environmental concerns. A critical need therefore exists for alternatives to present coatings for agricultural commodities which are fungicidal as well as safe for the consumer and the environment.

Antagonistic yeasts have been disclosed as effective biocontrol agents for the biological control of postharvest disease (Wilson and El Ghaouth. Symposium Proceeding, Beltsville Symposium XVIII. 1993). In addition, chitosan, an animal-derived polymer, has shown potnetial an an antifungal preservative. Chitosan and its derivatives are known to form a semi-permeable film (Averbach, B. L., Film-forming capability of chitosan, in *Proc. 1st Int. Conf. Chitin and Chitosan*. Muzzareli and Pariser, eds. MIT, Cambridge, Mass. 1978. p. 199), to be inhibitory to a number of pathogenic fungi (Allan and Hadwiger, *Exp. Mycol.* 1979. vol. 3, p. 285) and to activate a number of biological processes in plant tissues, including the stimulation of chitinases, the accumulation of phytoalexins, the synthesis of proteinase inhibitors, and increased lignification (Pearce et al., *Physiol. Plant Pathol.* 1982, vol. 20, p. 119; Mauch et al., *Plant Physiol.* 1988. vol. 76, p. 607; El Ghaouth et al., Potential use of chitosan in postharvest preservation of fruits and vegetables, in *Advances in Chitin and Chitosan*. Brines et al., eds. Elsevier Applied Sci., London. 1992. p. 440; El Ghaouth et al., *Phys. and Mol. Plant Pathol.* 1994. vol. 44, pp. 417–422). The polycationic nature of chitosan is believed to provide the basis for its physico-chemical and biological functionality. When applied as a coating, chitosan controlled decay and delayed ripening of strawberry, bell pepper, tomato and cucumber by acting as a selective barrier to gas diffusion (El Ghaouth et al., in *Advances in Chitin and Chitosan*. 1992, supra). The control of decay by chitosan is believed to originate, in part, from its antifungal property. Indeed, in vitro studies showed that chitosan not only inhibited the radial growth of major postharvest pathogens, but also induced severe morphological alterations in Rhizopus stolonifer and Botrytis cinerea, as well as increased cellular leakage in both fungi, presumably by interfering with fungal plasma membranes (El Ghaouth et al., *Mycol. Res.* 1992. vol. 96, p. 769; El Ghaouth et al., *Exp. Mycol.* 1992. vol. 16. p. 173). Although the biological activity of chitosan is well-documented, the mechanisms that underlie its ability to function as both a fungal inhibitor and an elicitor of plant defense reactions remains unclear.

SUMMARY OF THE INVENTION

Chitosans were not expected to be useful in combination with antagonistic yeasts due to their antifungal properties. Recently, however, we found that certain antagonistic yeasts were compatible with modified chitosans and that combining antagonists with such chitosans represented a promising approach to the control of decay and ripening. The combination of modified chitosans with antagonists makes it possible to exploit the antifungal and eliciting properties of chitosan, as well as the biological activity of the antagonist. The complexity of the mode of action displayed by combined alternatives makes the development of pathogen resistance more difficult and presents a highly complex disease deterrent barrier.

In accordance with this discovery, it is an object of the invention to provide a bioactive coating composition which comprises a modified chitosan matrix containing a yeast antagonistic to postharvest pathogens. Other objects and advantages of the invention will become readily apparent from the following description.

DETAILED DESCRIPTION OF THE INVENTION

Figure 1:
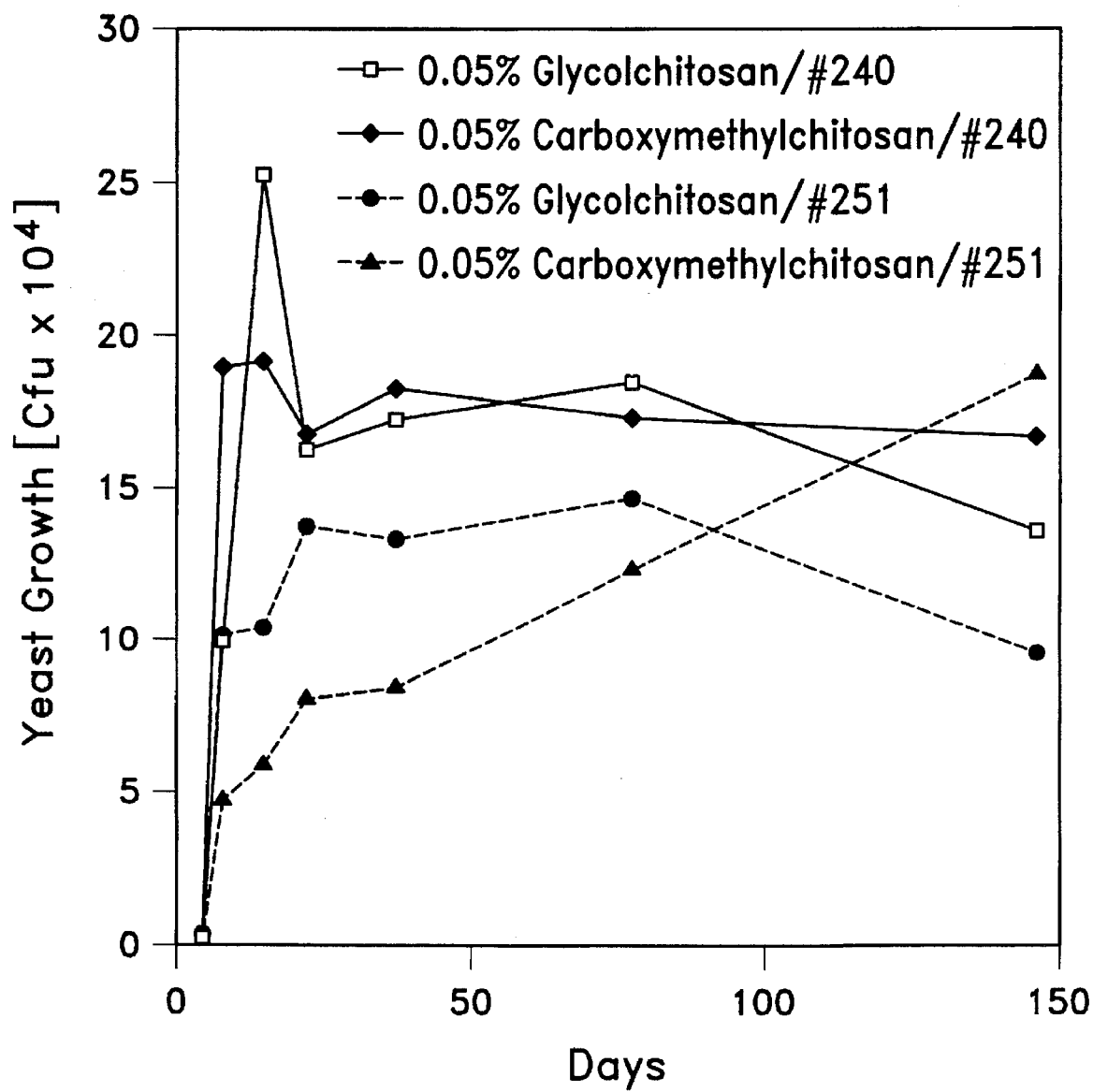
FIG. 1 shows the effects of modified chitosans on the growth of antagonistic yeasts.

The composition for coating agricultural commodities comprises modified chitosan and at least one yeast antagonistic to postharvest pathogens and resistant to the modified chitosan.

A number of chitosans were tested in combination with antagonistic yeasts, and only the modified chitosans glycolchitosan and carboxymethylchitosan were found to be effective. Both are commercially available from distributors such as NovaChem, Halifax, N. S., Canada, and Sigma Chemical Co., St. Louis, Mo.

Effective antagonistic yeasts have special properties in that they are resistant to the modified chitosan. While yeasts which have been found effective include *Candida oleophila* (*C. oleophila*), *Candida saitoana* (*C. saitoana*), *Candida sake* (*C. sake*), *Candida tinus* (*C. tinus*), *Candida utils* (*C. utils*) and *Pichia guilliermondii* (*P. guilliermondii*), it is well within the level of skill in the art to determine if a particular yeast shows the necessary resistance by combining the yeast with modified chitosans in culture and observing whether or not it remains viable and grows (see, for example, Example II).

The coating composition is prepared by dissolving an effective amount of the modified chitosan in water followed by the addition of an effective amount of the antagonistic yeast. Effective amounts of modified chitosan have been found to range from about 500 µg/ml to about 10,000 µg/ml, with about 500 µg/ml to about 5000 µg/ml being preferred and about 500 µg/ml being particularly preferred. Yeasts have been found effective at about $10^6$ colony forming units (cfu) to about $10^8$ cfu, with about $10^8$ being preferred. It is understood, however, that optimal concentrations will vary with particular situations, and it is well within the level of skill in the art to arrive at optimal formulations by following conventional testing procedures such as those described by the Examples.

In addition, glucose in the amount of about 0.02% (w/v) to about 0.2% (w/v) is also included in the composition, with about 0.2% (w.v) being preferred.

In practicing the invention, the composition is applied to the exterior surface of an agricultural commodity so as to form a protective coating. The specific method of application is not critical to the invention, and may include any of a variety of well known application techniques such as dipping or rolling the commodity in the coating composition, applying the composition (such as brushing, rolling, dripping, wiping or rubbing) to the commodity with an applicator, e.g. a brush, roller or wiper, spraying the composition onto the commodity, e.g. using a sprayer or atomizer. The composition may be applied at room temperature, then permitted to dry. Steps may be taken to expedite drying of the coating prior to any further handling or processing.

Any harvested agricultural commodity which is susceptible to postharvest fungal pathogens are suitable for treatment with the novel composition. These commodities include fruits, vegetables and nuts.

The combined fungicidal activities of the modified chitosan and the antagonistic yeast make this formulation an attractive preservative which is superior to existing coatings in that it ensures the maintenance and even distribution of the antagonistic yeast over the surface of the harvested commodity, thus increasing the effectiveness of the biological control agent.

The following examples are intended only to further illustrate the invention and are not intended to limit the scope of the invention as defined by the claims.

EXAMPLES

Example I

Preparation of Modified Chitosan Solutions and Yeasts

The modified chitosans glycolchitosan and carboxymethylchitosan were dissolved in water, and high ($\geq 960$ K.), intermediate, or practical grade, ($\approx 750$ K.) and low ($\leq 400$ K.) molecular weight chitosans were dissolved in 50 mM Na acetate buffer, pH 5.5. The solutions were subsequently diluted to concentrations of 500 and 5000 µg/ml. Glucose was added to 0.2% (w/v). The chitosans were obtained from Aldrich Chemical Co. and NovaChem, supra.

Cultures of *Penicillium expansum* Link (*P. expansum*), *Penicillium italicum* (*P. italicum*) and *Botrytis cinerea* Pers. Fr. (*B. cinerea*) were obtained from infected fruit and were maintained on potato dextrose agar (PDA). Spore suspensions were obtained by flooding 2-week-old cultures of *B. cinerea*, *P. italicum*, and *P. expansum* with sterile distilled water containing 0.1% (v/v) Tween 80. Spore counts were determined with a hemacytometer, and spore concentrations were adjusted to $10_5$ conidia or spores/ml with sterile distilled water.

*C. oleophila*, isolate 251 and *C. saitoana*, isolate 240, were obtained from tomato and citrus fruit and were grown for 48 hours at 27° C. Shake-flask cultures of 50 ml nutrient-yeast broth were started with approximately $10^8$ cfu of yeast and incubated on an orbital shaker set at 200 rpm for 24 hours. Yeast cells were collected by centrifugation at 3000 g for 20 min, resuspended in sterile distilled water, centrifuged and, if needed, resuspended in distilled water at a concentration of $10^8$. Ripe apples (cv. Red Delicious) were hand-harvested at the Appalachian Fruit Research Station, Kearneysville, W. Va. Pears and oranges were puchased locally and stored at 4° C. The fruit were sorted to remove any with apparent injuries or infections and randomly divided into lots of 18.

Example II

The Effect of Chitosans on the Growth of Yeasts and Pathogens.

The antifungal properties of different chitosans against the pathogens *B. cinerea*, *P. expansum* and *P. italicum* were determined. The modified chitosans glycolchitosan, carboxymethylchitosan, and low, intermediate and high molecular weight chitosan at final concentrations of 0, 500, or 5000 µg/ml in 1/10 strength malt extract were autoclaved, and 100 µl of each were dispensed into wells of 24-well microtiter plates. Each well was inoculated with 500 spores of *B. cinerea* and *P. expansum*. Four wells were used for each fungus per treatment. The microtiter plates were incubated in the dark at 24° C. Percent spore germination was determined periodically over a period of 5 days.

The effect of different chitosan solutions on the survival of *C. saitoana*, isolate 240, and *C. oleophila*, isolate 251, was also assessed. Pellets of the isolates were suspended in solutions of the different concentrations (0, 500, or 5000 µg/ml) of the modified and non-modified chitosan solutions described in Example I above. The suspensions were stored at 24° C. Aliquots were collected every week over a period of 40 days and dilution-plated in triplicate on yeast maltose agar medium. Plates were incubated at 24° C., and colonies were counted after 48 hours.

The low concentration of the non-modified chitosans was more effective in inhibiting spore germination of *B. cinerea* and *P. expansum* than either glycolchitosan or carboxymethylchitosan. At a concentration of 250 µg/ml, the chitosans completely inhibited spore germination of both pathogens, whereas complete inhibition was obtained with glycolchitosan and carboxymethylchitosan at concentrations of 500 and 5000 µg/ml, respectively. At concentrations of 250 µg/ml, non-modified chitosans completely inhibited growth of *C. saitoana* and *C. oleophila*, while glycolchitosan and carboxymethylchitosan at 5000 µg/ml did not affect the growth of the antagonistic yeasts (FIG. 1).

Example III

Figure 2:
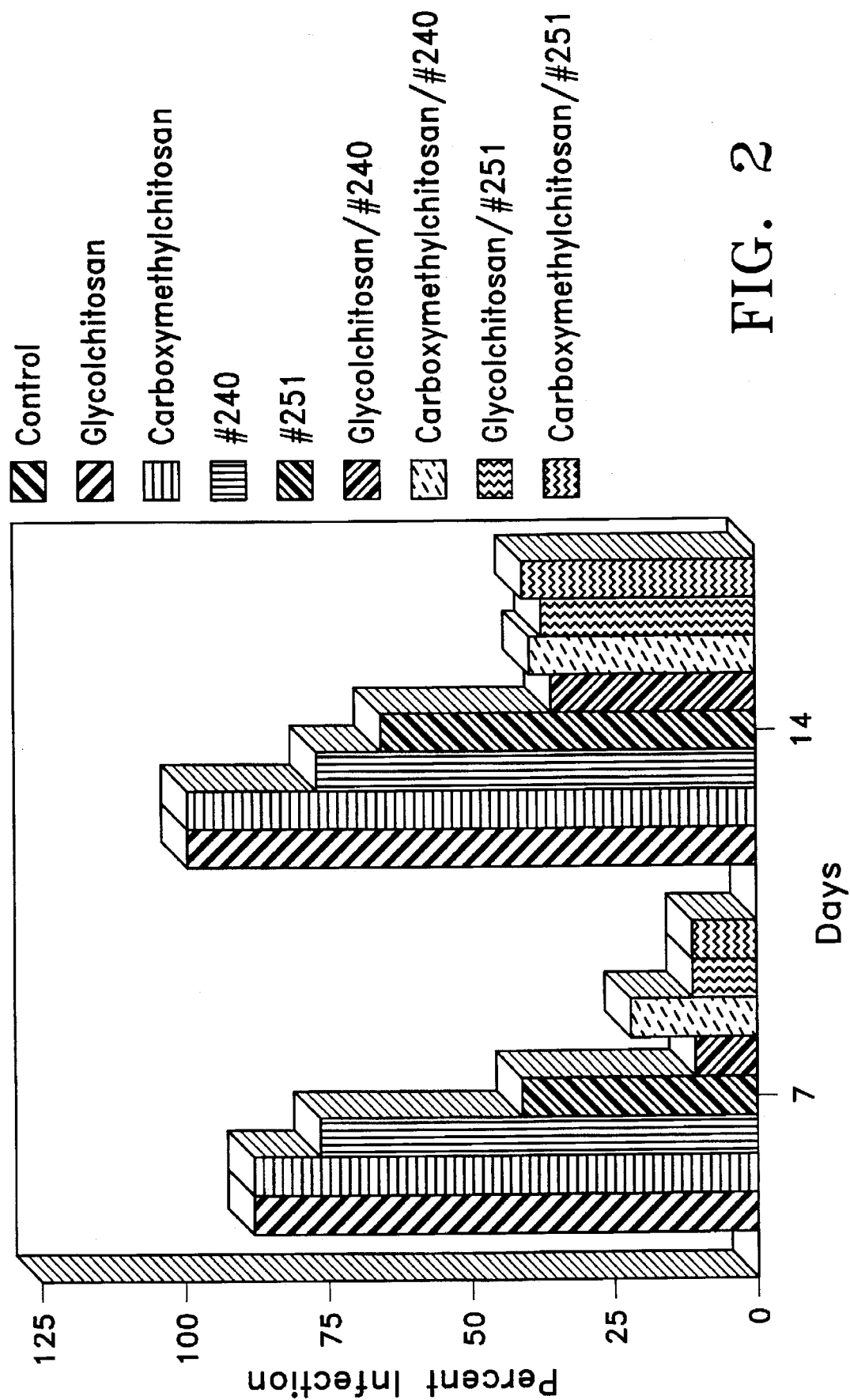
FIG. 2 shows the biocontrol activity of the combination of modified chitosans and antagonistic yeasts on pathogens in apples.
Figure 3:
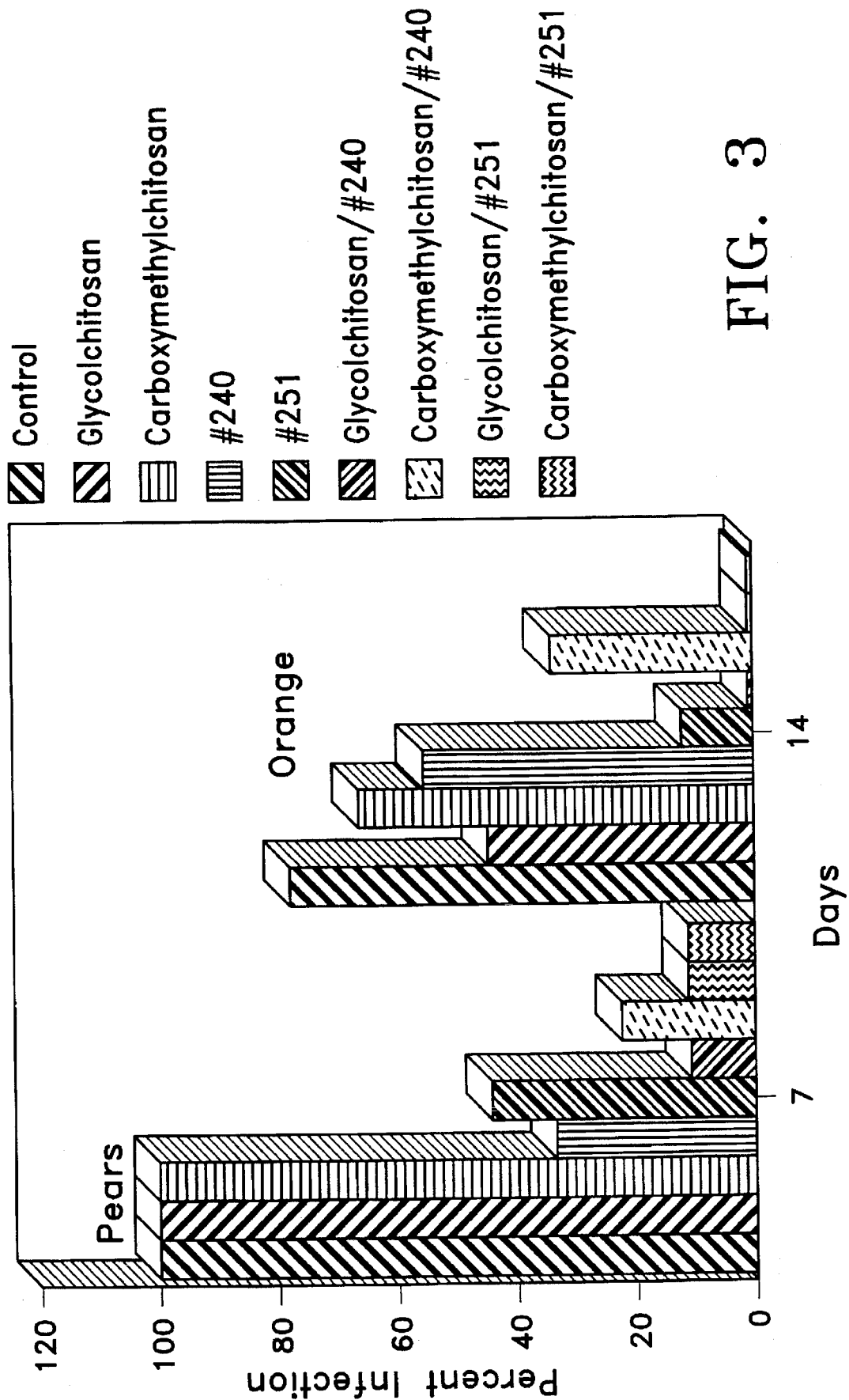
FIG. 3 shows the biocontrol activity of the combination of modified chitosans and antagonistic yeasts on pathogens in pears and oranges.

Biocontrol Activity of the Combination of Modified Chitosan and Antagonistic Yeast Yeast cells from 48-hour cultures of *C. saitoana*, isolate 240, and *C. oleophila*, isolate 251, were pelleted by centrifugation, resuspended in sterile distilled water, and centrifuged. Pellets were suspended in different concentrations (0, 500, and *5000* Bg/ml) of the various modified and non-modified chitosans, all containing 0.2% glucose. The concentrations of the yeast suspensions were adjusted to $10^8$ cfu/ml. Apple, pear and orange fruit were individually wounded using a cork borer. Fruit wounds were treated with the different chitosan solutions containing antagonistic yeasts by placing 50 µl of each treatment into each wound and allowing the wounds to dry for 30 min at room temperature. Thereafter, the wounds were challenge-inoculated with 30 µl of a spore suspension of a pathogen spore suspension described in Example I (B. cinerea on apple, *P. expansum* on pear and *P. italicum* on orange), and the fruit were incubated at 24° C. in plastic trays at high humidity (above 95% R.H). Non-inoculated controls and chitosan-treated fruit were kept under the same conditions of storage. For each treatment, four replicates of 18 fruit were arranged in a randomized complete block design. The tests were repeated three times. Lesion diameter and percent infection were determined for each treatment over a period of 14 days after challenge. Results are shown in FIGS. 2 and 3.

Example IV

Effects of Modified and Non-modified Chitosan Concentrations on Antagonistic Yeasts The effect of different concentrations of modified and non-modified chitosans on the survival of *C. saitoana*, isolate 240, and *C. oleophila*, isolate 251, at the wound site was studied using apple fruit. Fruit were wounded, treated with cell suspensions of the yeasts ($10^8$ cfu/ml) in 0, 500 or 5000 μg/ml solutions of the modified and non-modified chitosans as described in Example I and stored at 24° C. There were four replicates of five fruit per treatment with complete randomization and at each sampling date, samples were collected from three replicate fruit per treatment. Wounds were sampled 0, 1, 2 and 3 days after inoculation. Wound tissue was scraped with a sterile inoculating needle. The dislodge material was suspended in 10 ml sterile water, macerated with a glass rod, vortexed, dilution-plated in triplicate on yeast-maltose agar medium, and the plates were incubated at 24° C. Colonies were counted after 48 hours. Only those yeasts grown in modified chitosans survived.

Example V

Effects of Low Temperature Storage of Treated Fruits

Additional tests with apple fruit were also done to determine the effect of low temperature storage on the biocontrol activity of the combination of glycolchitosan and carboxymethylchitosan with *C. saitoana*, isolate 240, and *C. oleophila*, isolate 251. Fruit wounds were treated with 50 μl of yeast suspensions at $10^8$ cfu/ml in 0, 500 or 5000 μg/ml glycolchitosan and carboxymethylchitosan containing 0.2% glucose. Thirty minutes later, wounds were challenged with 30 μl of a spore suspension of *B. cinerea* and stored at 4° C. in plastic trays. For each treatment, four replicates of 18 fruit were arranged in a randomized complete block design. The experiment was repeated twice. Fruit were evaluated periodically for disease development over a period of 40 days, and diseased fruit were immediately discarded.

The combination of low, intermediate and high molecular weight chitosan with antagonistic yeast did not result in any significant increase in the control of decay, probably due to the fact that these chitosans are inhibitory to the yeast antagonists. With apple, the combination of glycolchitosan or carboxymethylchitosan at 500 μg/ml with *C. saitoana* or *C. oleophila* was more effective in controlling decay than either the antagonists or modified chitosan alone (FIG. 2). Increasing the concentration of glycolchitosan or carboxymethylchitosan from 500 to 5000 μg/ml did not result in any significant increase in the effectiveness of the combination. After 14 days of storage at 24° C., less than 40% of the apples treated with the combination of glycolchitosan or carboxymethylchitosan with *C. saitoana* or *C. oleophila* developed infection while in fruit treated with either *C. saitoana* or *C. oleophila* alone, more than 75% and 65% of fruit were diseased, respectively. All fruit treated with either glycolchitosan or carboxymethylchitosan and the control were diseased (FIG. 2). Similar control of decay by the bioactive coating was also observed in pear and orange fruit challenged with *P. expansum* and *P. italicum*, respectively (FIG. 3).

The inhibitory effect of the bioactive coating is further amplified at low temperature. A complete control of decay was obtained with the bioactive coating for up to 40 days of storage at 4° C.

The effectiveness of the combination of *C. saitoana* or *C. oleophila* with glycolchitosan or cargoxymethylchitosan in controlling decay appears to stem from the interplay of the biological activity of the antagonistic yeasts and the antifungal and eliciting properties of chitosan.

All references cited hereinabove are herein incorporated by reference.

We claim:

1. A bioactive coating for agricultural commodities, said coating comprising amounts effective for biocontrol activity of a modified chitosan, at least one antagonistic yeast effective for the biocontrol of postharvest diseases and glucose, wherein said modified chitosan is glycolchitosan or carboxymethylchitosan.

2. The bioactive coating of claim 1, wherein said effective amount of modified chitosan is from about 500 μg/ml to about 10,000 μg/ml.

3. The bioactive coating of claim 2, wherein said effective amount of modified chitosan is about 500 μg/ml to about 5000 μg/ml.

4. The bioactive coating of claim 3, wherein said effective amount of modified chitosan is about 500 μg/ml.

5. The bioactive coating of claim 1, wherein said at least one antagonistic yeast is selected from the group consisting of *Candida oleophila, Candida saitoana, Candida sake, Candida tinus, Candida utils* and *Pichia guilliermondii.*

6. The bioactive coating of claim 5, wherein said at least one yeast is *Candida oleophila* or *Candida saitoana.*

7. The bioactive coating of claim 1, wherein said effective amount of said at least one antagonistic yeast is about $10^6$ colony forming units to about $10^8$ colony forming units.

8. The bioactive coating of claim 7, wherein said effective amount of said at least one antagonistic yeast is about $10^8$ colony forming units.

9. The bioactive coating of claim 1, wherein said effective amount of glucose is about 0.02% (w/v) to about 0.2% (w/v).

10. The bioactive coating of claim 9, wherein said effective amount of glucose is about 0.2% (w/v).

* * * * *